Patented May 3, 1938

2,116,084

UNITED STATES PATENT OFFICE 2,116,084

SYNTHETIC RESIN COMPOSITION

Sydney Leonard Morgan Saunders, London, England

No Drawing. Application April 17, 1935, Serial No. 16,755. In Great Britain August 13, 1934

10 Claims. (Cl. 260—2)

This invention relates to synthetic resin compositions.

It has been proposed hitherto to prepare synthetic resin composition suitable for use as coatings, by reacting, inter alia, phenol di-alcohols with esters, at elevated temperatures. The di-alcohols are prepared from substituted phenols, simple or di-nuclear, such that they contain not more than two reactive positions in the molecule. If these di-alcohols are warmed with a small quantity of an acid catalyst such as hydrochloric acid in the presence of a glycerol ester of a fatty acid, i. e., a vegetable oil, they react very vigorously evolving formaldehyde, and producing rubbery products which are entirely unsuited for coating compositions.

Further, if they are warmed with the acid catalyst, in the absence of ester, a vigorous exothermic reaction occurs, with the evolution of formaldehyde, and the formation of an infusible insoluble product.

It has now been discovered that if the reaction in the presence of an acid catalyst such as hydrochloric acid is modified by the addition of a quantity of phenol, such quantity being for example less than two molecules of phenol to one molecule of di-alcohols, products are obtained which are soluble in a variety of solvents, depending on the constitution of the phenol used.

Moreover, the reaction may now be carried out in the presence of a vegetable oil, with the production of viscous, but not rubbery products, which are extremely suitable for preparing coating compositions.

According to the present invention, a process for preparing synthetic resin compositions suitable for use as coatings, comprises reacting at a temperature in the neighbourhood of 100° C. or above, phenol di-alcohols with other phenols, preferably in quantity less than two molecules of phenol to one molecule of di-alcohol in the presence of an acid catalyst.

It has been proposed hitherto to prepare water-soluble synthetic tanning agents by condensing phenol alcohols with resorcinol at a temperature below 50° C. These products are not suitable for the manufacture of spirit or oil varnishes with which this invention is primarily concerned and for which higher condensations obtained with a reacting temperature in the neighbourhood of 100° C. are required.

The invention also includes a process whereby the reaction between the phenol di-alcohol and the phenol in the presence of an acid catalyst is carried out in the presence of a vegetable oil, or naturally occurring resin acids or esterified resin acids.

The invention also includes a process whereby the reaction is carried out in the presence of an inert gas.

The invention further includes lacquers and varnishes comprising synthetic resin compositions prepared according to the preceding paragraphs.

The most convenient di-alcohol to use is that obtained from p-cresol since it is obtainable in a comparatively pure state. The method is that of Auwers (Ber. 40 2532), whereby one gram molecule of p-cresol, one gram molecule of caustic soda, and two gram molecules of formaldehyde, as formalin, are allowed to react in solution at room temperature. Addition of acid precipitates the p-cresol di-alcohol in a comparatively pure state. Other di-alcohols may be used if desired.

Any phenol may be used to react with the di-alcohol, but it is desirable that the proportion should be sufficient to form a resin which will be completely soluble in vegetable oils. Thus, a resin formed from 1 mol. para-cresol di-alcohol and 1 mol. cresylic acid will not be completely soluble in vegetable oils, but by increasing the proportion of cresylic acid from 1 mol. to 1.9 mols complete solubility in the resultant resins is obtained. Moreover, certain phenols confer special properties on the final products and consequently are used in preference to others. This is particularly the case where the reaction occurs in the presence of drying oils or when the reaction product is intended for use with drying oils. For example, there is nearly always a small quantity of unchanged phenol remaining at the end of the reaction, and since phenols have a pronounced effect on drying oils, the structure of the phenol will seriously effect the properties of the final product.

Thus all substituted mono-nuclear phenols delay the drying of oils, whereas dihydric di-nuclear phenols produced from higher aldehydes and ketones, and phenols other than ortho-cresol do not seriously affect, and in some cases actually improve the drying properties. Considerable advantages, therefore, accrue by using such dihydric di-nuclear phenols.

Again, all substituted mono-nuclear phenols cause discolouration in coatings exposed to light and air, whereas the dihydric di-nuclear phenols referred to above do not exhibit this property.

It is possible, therefore, by suitable choice of phenol, to prepare light fast coatings possessing excellent drying properties from phenol formaldehyde synthetic resin compositions.

The following examples illustrate the scope of the invention, but do not restrict it. The parts are by weight.

(1) Equal parts of p-cresol di-alcohol and cresylic acid are warmed together to 100° C., and 0.5% hydrochloric acid added. When the vigorous reaction has subsided, the product is dissolved in methylated spirits to give a quick drying varnish which will harden under the action of heat.

(2) Equal parts of the mixture of di-alcohols obtained from cresylic acid, and phenol, are warmed together with 0.5% hydrochloric acid. When the reaction has subsided the product is dissolved in methylated spirits to give a varnish which stoves to a hard insoluble film at 100° C. in 2 hours.

(3) Equal parts p-cresol di-alcohol, and the p-tertiary butyl phenol are warmed to 100° C. with 0.5% hydrochloric acid. The temperature is gradually raised to 150° C., when a brilliant hard resin is produced, which is insoluble in drying oils.

(4) Five parts p-cresol di-alcohol, and ten parts of an equimolecular mixture of di-phenylol ethane, and di-para cresylol ethane, prepared from acetaldehyde and an excess of an equimolecular mixture of phenol and para cresol, are heated to 100° C., with 0.5% hydrochloric acid. The temperature is gradually raised to 150° C., when a very pale, brittle resin is produced which is soluble in drying oil.

(5) Two parts p-cresol di-alcohol and three parts of di-para cresylol ethane are dissolved in 50 parts China-wood oil at 120° C., 0.1% hydrochloric acid is added, and the temperature gradually raised to 250° C. It is then cooled, mineral spirits and driers added to produce a varnish which air dries in 5-6 hours.

(6) Six parts p-cresol di-alcohol, and 12 parts di-phenylol ethane are dissolved in 50 parts China-wood oil at 120° C., .2% hydrochloric acid is added and the temperature gradually raised to 250° C. Mineral spirits are added when cool, together with driers. The varnish dries in 3-4 hours producing an exceptionally hard and tough film.

(7) 25 parts of p-cresol di-alcohol and 50 parts di-para cresylol propane, are dissolved in 300 parts of China-wood oil at 120° C. 0.1% hydrochloric acid is added and the temperature raised gradually to 250° C., kept at this temperature for 30 minutes and then allowed to cool. A steady stream of carbon dioxide is passed during the dissolving, heating and cooling, which takes place in an enclosed vessel with one outlet. Mineral spirits and driers are added to produce a varnish which air dries in 5-6 hours.

(8) 15 parts of p-cresol di-alcohol are added gradually to a mixture of 15 parts di-para-cresylol propane and 60 parts esterified rosin to which 0.1% hydrochloric acid has been added, the mixture being maintained at a temperature of 130° C. until all the di-alcohol has been added. The temperature is then raised gradually to 250° C. and kept there for one hour. On cooling, a hard clear resin is produced, which is completely soluble in vegetable oils.

Having now particularly described and ascertained the nature of my said invention and in what manner the same is to be performed, I declare that what I claim is:—

1. A process for preparing a synthetic resin composition which comprises reacting at a temperature above about 100° C. para-cresol di-alcohol with di-para-cresylol ethane in the presence of an acid catalyst.

2. A process for preparing a synthetic resin composition which comprises reacting at a temperature above about 100° C. para-cresol di-alcohol with di-para-cresylol ethane in the presence of an acid catalyst and a drying oil.

3. A process for preparing a synthetic resin composition which comprises reacting at a temperature above about 100° C. para-cresol di-alcohol with di-para-cresylol ethane in the presence of hydrochloric acid and China-wood oil.

4. A process for preparing a coating composition which comprises reacting at a temperature above 100° C. a phenol dialcohol with a di-hydric di-nuclear phenol in which the two nuclei are substituents of a homologue of methane in the presence of an acid catalyst; the reacting ingredients being dissolved in a drying oil.

5. A process for preparing a coating composition which comprises reacting at a temperature above 100° C. a phenol dialcohol with a dihydric dinuclear phenol in which the two nuclei are substituents of a homologue of methane in the proportion of less than 2 gramme molecules of phenol to 1 gramme molecule of phenol alcohol in the presence of an acid catalyst; the reacting ingredients being dissolved in a drying oil.

6. A process for preparing a coating composition which comprises reacting at a temperature above 100° C. a phenol dialcohol with a dihydric dinuclear phenol in which the two nuclei are substituents of a homologue of methane in the presence of an acid catalyst and in the presence of a naturally occurring resin acid.

7. A process for preparing a coating composition which comprises reacting at a temperature above 100° C. a phenol dialcohol with a dihydric dinuclear phenol in which the two nuclei are substituents of a homologue of methane in the presence of an acid catalyst and in the presence of an ester of a naturally occurring resin acid.

8. A process for preparing a synthetic resin composition which comprises reacting at a temperature above about 100° C. in the presence of an acid catalyst, a phenol di-alcohol with a di-hydric di-nuclear phenol in which the two nuclei are substituents of a homologue of methane.

9. A process for preparing a synthetic resin composition which comprises reacting at a temperature above about 100° C. in the presence of an acid catalyst and in the presence of a drying oil, a phenol di-alcohol with a di-hydric di-nuclear phenol in which the two nuclei are substituents of a homologue of methane.

10. A process for preparing a synthetic resin composition which comprises reacting at a temperature above about 100° C., para-cresol di-alcohol with di-para-cresylol propane in the presence of an acid catalyst.

SYDNEY LEONARD MORGAN SAUNDERS.